United States Patent Office 3,355,497
Patented Nov. 28, 1967

3,355,497
MANUFACTURE OF 4,4'-DICHLORODIPHENYL SULFONE
Edward G. Budnick, Garwood, N.J., assignor to Plains Chemical Development Co., Garwood, N.J., a corporation of New Jersey
No Drawing. Filed Feb. 1, 1965, Ser. No. 429,636
7 Claims. (Cl. 260—607)

ABSTRACT OF THE DISCLOSURE 4,4'-dichlorodiphenyl sulfone is prepared by reacting a mixture of one mol of dimethyl pyrosulfate and two to three mols of sulfur trioxide with at least one mol of chlorobenzene over the number of mols of sulfur trioxide at a temperature of from room temperature to 100° C.

This invention relates to the preparation of 4,4'-dichlorodiphenylsulfone.

It has been proposed to prepare 4,4'-dichlorodiphenylsulfone by reacting an equimolar mixture of dimethyl pyrosulfate and sulfur trioxide with chlorobenzene, Joly Patent 2,971,985. As shown in the Joly patent, it is essential to employ 1 mole of dimethyl pyrosulfate for each mole of sulfur trioxide and for each two moles of chlorobenzene since for each mole of the 4,4'-dichlorodiphenylsulfone formed there is also formed two moles of methyl acid sulfate acid by-product. The methanesulfonic acid is eventually hydrolyzed to methyl alcohol and sulfuric acid and dumped into the sewer.

The dimethyl pyrosulfate employed is relatively expensive and eventually ends up as a waste by-product. As a result, the overall cost of making 4,4'-dichlorodiphenylsulfone is relatively high.

It is an object of the present invention to develop a more economical method of preparing 4,4'-dichlorodiphenylsulfone.

Another object is to reduce the amount of dimethyl pyrosulfate which is lost in forming the 4,4'-dichlorodiphenylsulfone.

A further object is to prepare 4,4-dichlorodiphenylsulfone in good yields.

Still further objects and the entire scope of applicability of the present invention will become apparent from the detailed description given herein after; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting a mixture of 1 mole of dimethyl pyrosulfate and 2 to 3 moles of sulfur trioxide with chlorobenzene. Usually 3 to 4 moles of chlorobenzene are used per mole of dimethyl pyrosulfate, preferably 4 moles of the chlorobenzene being used. It has been found that for purpose of the reaction there are reacted 2 moles of chlorobenzene for each mole of sulfur trioxide, the dimethyl pyrosulfate acting as a catalyst or carrier for the reaction. Preferably, 2 moles of sulfur trioxide are mixed with 1 mole of dimethyl pyrosulfate. If excess chlorobenzene over that required for the reaction is employed, it is recovered quantitatively and can be recycled for further reaction. The process of the invention is suitable for obtaining yields of 4,4'-dichlorodiphenysulfone in the order of 90%. The amount of chlorobenzene employed can be increased to 8 moles or more per mole of dimethyl pyrosulfate.

The mechanism of the present invention is different from that set forth in Joly since the yields of 4,4'-dichlorodiphenylsulfone based on the chlorobenzene reacted are substantially higher than can be accounted for by the amount of dimethyl pyrosulfate employed as well as by the amount of methyl acid sulfate formed.

The dimethyl pyrosulfate either can be preformed or can be formed in situ. Thus, dimethyl pyrosulfate can be formed from 1 mole of dimethyl sulfate and 1 mole of sulfur trioxide or from 2 moles of dimethyl ether and 1 mole of sulfur trioxide.

A convenient way of carrying out the reaction when the dimethyl pyrosulfate is formed in situ is to simply admix 3 to 4 moles of sulfur trioxide with 1 mole of dimethyl sulfate and then add 2 to 4 moles of chlorobenzene to the mixture.

The reaction between the dimethyl pyrosulfate, sulfur trioxide and chlorobenzene can be carried out conveniently at from room temperature to 100° C. and there is no need to heat or cool the mixture, although temperatures of 50–60° C. are preferred.

There is no need to isolate or separate intermediate products or secondary by-products. As has been set forth above, the present process greatly reduces the amount of methane sulfonic acid by-product as compared with the Joly procedure. In fact, the amount of dimethyl pyrosulfate required is about half that employed in the Joly process.

Unless otherwise indicated, all parts and percentages are by weight.

Example 1

3 moles of sulfur trioxide were added to 1 mole of dimethyl sulfate at 40–50° C., thereby forming 1 mole of dimethyl pyrosulfate in the presence of 2 moles of excess sulfur trioxide. The liquid mixture was then added gradually to 4 moles of chlorobenzene maintained at 50–55° C. The mixture was kept at 50° C. while agitating for one hour after the addition. The mixture was then poured into 33 moles of water. The sulfone which precipitated was filtered off and washed with hot water until the pH of the wash water was 5. After drying, there was obtained 1.764 moles (88.7% yield dichlorodiphenylsulfone based on the chlorobenzene reacted) of 4,4'-dichlorodiphenylsulfone.

Example 2

2 moles of sulfur trioxide were added to 0.5 mole of dimethyl sulfate at 40–50° C. to form 0.5 mole of dimethyl pyrosulfate in the presence of 1.5 moles of excess sulfur trioxide. The liquid mixture was then added gradually to 2.1 moles of chlorobenzene maintained at 50–55° C. The mixture was worked up as in Example 1 to obtain 0.64 mole (61% yield based on the chlorobenzene reacted) of 4,4'-dichlorodiphenylsulfone.

What is claimed is:
1. A process for the preparation of 4,4'-dichlorodiphenylsulfone which comprises reacting a mixture of 1 mole of dimethyl pyrosulfate and 2 to 3 moles of sulfur trioxide with chlorobenzene in an amount of at least one mol more than the number of mols of sulfur trioxide at a temperature of room temperature up to 100° C. and recovering 4,4'-dichlorodiphenylsulfone.
2. A process according to claim 1 wherein there is employed at least twice as many moles of chlorobenzene as sulfur trioxide.
3. A process according to claim 1 wherein the mixture of dimethyl pyrosulfate and sulfur trioxide is formed in situ by the reaction of 3 to 4 moles of sulfur trioxide with 1 mole of dimethyl sulfate.
4. A process according to claim 1 wherein the mixture of dimethyl pyrosulfate and sulfur trioxide is formed in situ by the reaction of 4 to 5 moles of sulfur trioxide with 1 mole of dimethyl ether.

5. A process according to claim 1 wherein there are employed 3 to 4 moles of chlorobenzene for each mole of dimethyl pyrosulfate.

6. A process according to claim 5 carried out at 50–60° C.

7. A process for the preparation of 4,4'-dichlorodiphenylsulfone which comprises reacting a mixture of 1 mole of dimethyl pyrosulfate and 2 moles of sulfur trioxide with 4 moles of chlorobenzene at a temperature of room temperature up to 100° C. and recovering the 4,4'-dichlorodiphenylsulfone.

References Cited
UNITED STATES PATENTS 2,971,985  2/1961  Joly et al. ‒‒‒‒‒‒‒‒‒ 260—607

JOSEPH P. BRUST, *Primary Examiner.*

D. R. PHILLIPS, *Assistant Examiner.*

UNITED STATES PATENT OFFICE
CERTIFICATE OF CORRECTION

Patent No. 3,355,497 November 28, 1967

Edward G. Budnick

It is hereby certified that error appears in the above numbered patent requiring correction and that the said Letters Patent should read as corrected below.

Column 1, line 29, for "methanesulfonic acid" read -- methyl acid sulfate --.

Signed and sealed this 14th day of January 1969.

(SEAL)
Attest:

Edward M. Fletcher, Jr.
Attesting Officer

EDWARD J. BRENNER
Commissioner of Patents